United States Patent [19]
Yahagi

[11] Patent Number: 5,745,298
[45] Date of Patent: Apr. 28, 1998

[54] ZOOM LENS SYSTEM

[75] Inventor: Satoshi Yahagi, Saitama-ken, Japan

[73] Assignee: Fuji Photo Optical Co., Ltd., Japan

[21] Appl. No.: 538,009

[22] Filed: Oct. 2, 1995

[30] Foreign Application Priority Data

Oct. 13, 1994 [JP] Japan .................................. 6-247498
Sep. 6, 1995 [JP] Japan .................................. 7-229204

[51] Int. Cl.⁶ ........................... G02B 15/14; G02B 15/02
[52] U.S. Cl. ........................................ 359/683; 359/674
[58] Field of Search ............................... 359/683, 674, 359/676

[56] References Cited

U.S. PATENT DOCUMENTS

| | | | |
|---|---|---|---|
| 4,157,211 | 6/1979 | Tanaka et al. | 359/674 |
| 5,061,051 | 10/1991 | Miyamae | 359/683 |
| 5,095,387 | 3/1992 | Horiuchi | 359/683 |
| 5,301,064 | 4/1994 | Sugi et al. | 359/683 |
| 5,414,562 | 5/1995 | Ueda | 359/683 |
| 5,537,255 | 7/1996 | Tochigi | 359/684 |

FOREIGN PATENT DOCUMENTS

| | | |
|---|---|---|
| 0506108 | 9/1992 | European Pat. Off. . |
| 3237420 | 10/1991 | Japan . |
| 1517002 | 10/1989 | U.S.S.R. . |

*Primary Examiner*—Scott J. Sugarman
*Attorney, Agent, or Firm*—Sixbey, Friedman, Leedom & Ferguson, P.C.; Gerald J. Ferguson, Jr.; Evan R. Smith

[57] ABSTRACT

A zoom lens system includes first to fifth lens groups arranged in this order from the object side. The first, third and fifth lens groups are fixed. The second lens group is moved in the direction of the optical axis of the zoom lens system when zooming the zoom lens system and the fourth lens group is moved in the direction of the optical axis to correct change in the image position due to the zooming and to correct change in the image position due to change in the object distance. The first lens group has a positive refracting power, the second lens group has a negative refracting power, the third lens group has a negative refracting power, the fourth lens group has a positive refracting power and the fifth lens group has a positive refracting power.

5 Claims, 4 Drawing Sheets

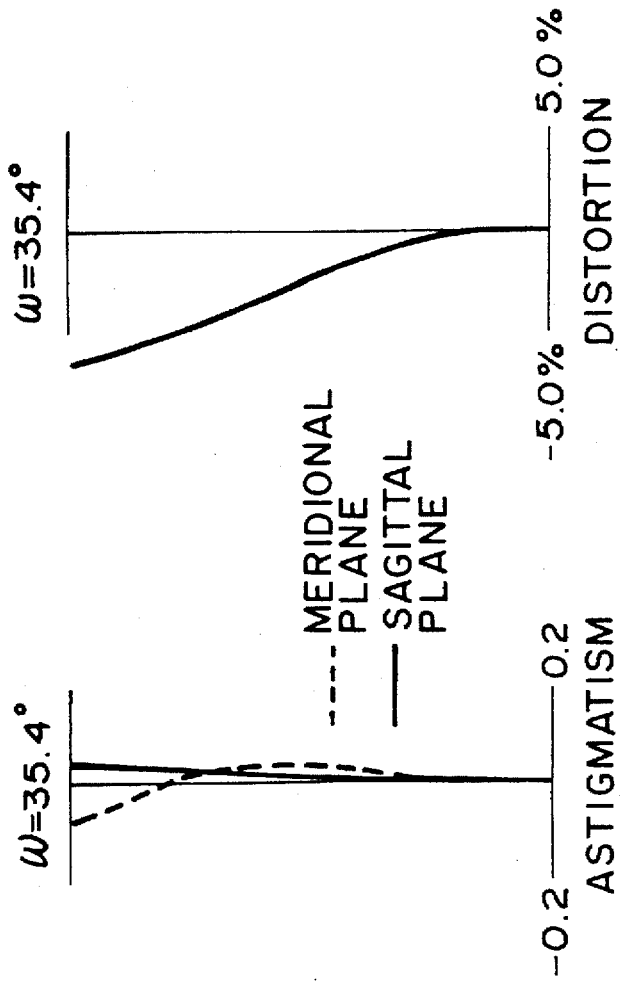

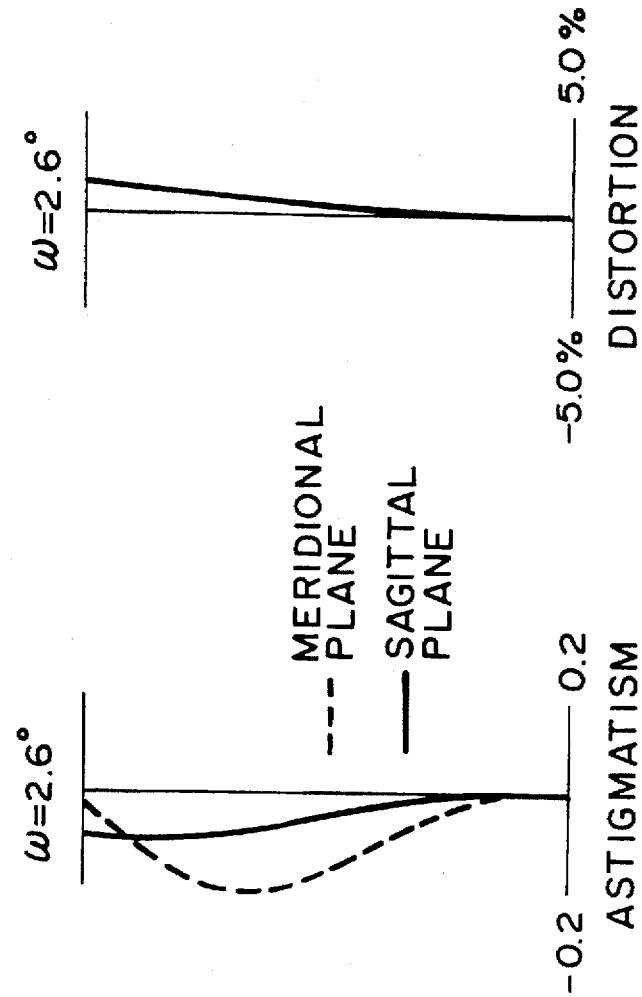
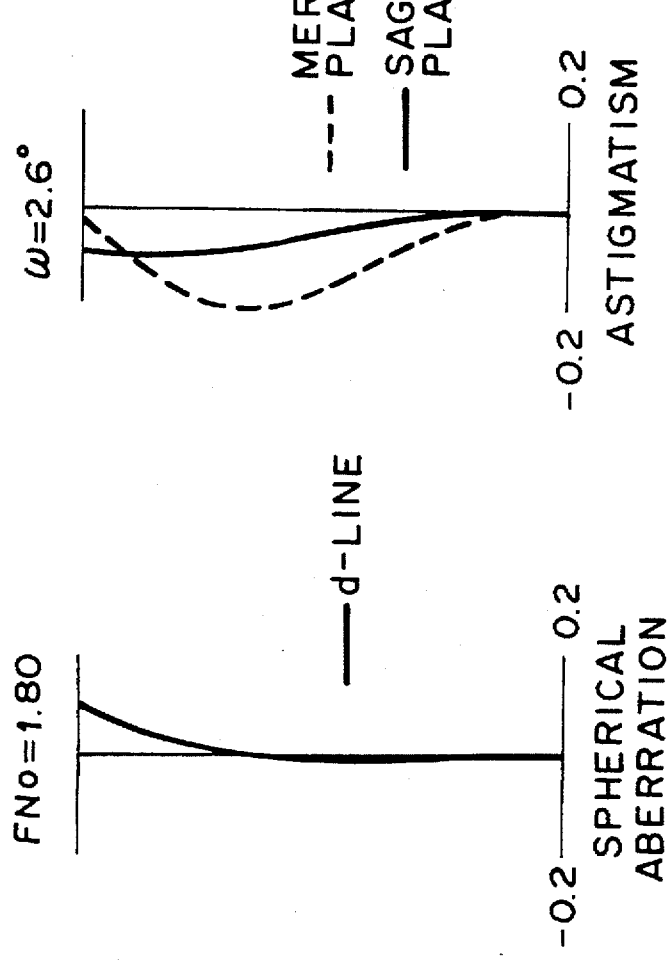

5,745,298

ZOOM LENS SYSTEM

BACKGROUND OF THE INVENTION

1. Field of the invention

This invention relates to a zoom lens system, and more particularly to a zoom lens system for a TV camera for broadcasting or commercial use.

2. Description of the Related Art

Zoom lens systems for a TV camera for broadcasting or commercial use generally comprise a first lens group which corrects change in the image position due to change in the distance to the object by moving the whole first lens group of a part of the first lens group in the direction of the optical axis, a second lens group which moves in the direction of the optical axis in the same manner as the first lens group and changes the focal length of the whole zoom lens system, a third lens group and a fourth lens group which is provided with a stop and has a positive refracting power for imaging.

The fourth lens group is divided into front and rear halves widely spaced from each other in the direction of the optical axis. An optical element such as an extender, an anamorphic lens or the like is sometimes got in and out of between the front and rear halves of the fourth lens group and the front half of the fourth lens group is arranged to substantially collimate a light bundle emanating therefrom in order to simplify designing and structure of the optical element to be got in and out of between the front and rear halves. A prism block and/or a low-pass filter is disposed behind the fourth lens group in order to divide the light bundle into red, green and blue light bundles.

Such zoom lens systems have been long used for many TV cameras because of easiness in designing since functions of the respective lens groups are clear and the lens which causes fluctuation in aberrations due to zooming can be clearly pointed out in such lens systems.

However such zoom lens systems are disadvantageous in that the first lens group comprising a lens element having the largest or a larger diameter in the whole zoom lens system is moved in the direction of the optical axis when focusing the zoom lens system, and accordingly when focusing is electrically effected, response of movement of the first lens group to the focusing operation becomes slow due to a heavy weight of the first lens group and there is a fear that focusing cannot satisfactorily follow a high-speed object.

Recently there have been employed zoom lens systems which comprise four or five lens groups and in which the first and third lens groups are fixed, zooming is effected by moving the second lens group in the direction of the optical axis and change in the image position due to zooming or change in the object distance is corrected by moving the fourth lens group in the direction of the optical axis. The third lens group has a positive refracting power.

Because of its simple structure and small size, such a zoom lens system has been wide used in video cameras for amateurs.

When such a zoom lens system is used for a TV camera for broadcasting or commercial use, the following problem will arise. That is, as a zoom lens system for such a TV camera, a mechanism for moving an optical element such as an extender, an anamorphic lens or the like in and out of the optical axis is necessary and a collimated region where the light rays are collimated must be provided. Such a collimated region may be provided, for instance, behind the third lens group. However when the collimated region is behind the third lens group, the light rays in the collimated region lose parallelism when the object distance changes since change in the image position due to change in the object distance is corrected by the fourth lens group behind both the third lens group and the collimated region. When the parallelism of the light rays changes with change in the object distance, the performance of the lens system with the optical element inserted between the fourth and fifth largely changes and deteriorates, which makes it difficult to use the zoom lens system as a zoom lens system for broadcasting or commercial use where performance requirement is severer. Further since the light rays diverged by the second lens group are collimated by the third lens group which is disposed just behind the second lens group and has a positive refracting power, a sufficient height of light rays cannot be obtained, and at the same time, since the refracting power of the system composed of the fourth and fifth lens groups behind the third lens group is positive, the light rays are converged and a required back focal length cannot be obtained.

When the collimated region is formed behind the fourth lens group, distribution of the refracting power between the third lens group having a positive refracting power and the fourth lens group. That is, when the refracting power of the third lens group is large, the refracting power of the fourth lens group must be small, which makes very large the travel distance of the fourth lens group for correcting change in the image position due to change in the object distance and makes it impossible to miniaturize the overall lens system. On the other hand, when the refracting power of the third lens group is small, the refracting power of the fourth lens group must be large, which enlarges change in aberrations due to change in the object distance.

SUMMARY OF THE INVENTION

In view of the foregoing observations and description, the primary object of the present invention is to provide a zoom lens system which has a collimated region free from change due to change in the object distance and can be compact in size.

The zoom lens system of the present invention comprises first to fifth lens groups arranged in this order from the object side, the first, third and fifth lens groups being fixed, the second lens group being moved in the direction of the optical axis of the zoom lens system when zooming the zoom lens system and the fourth lens group being moved in the direction of the optical axis to correct change in the image position due to the zooming and to correct change in the image position due to change in the object distance, and is characterized in that the first lens group has a positive refracting power, the second lens group has a negative refracting power, the third lens group has a negative refracting power, the fourth lens group has a positive refracting power and the fifth lens group has a positive refracting power.

It is preferred that the fourth lens group is arranged so that light rays emerging from the fourth lens group are focused at infinity or at a sufficiently distant position.

A desired optical element such as an extender or an anamorphic lens may be provided to be inserted into and retracted from between the fourth and fifth lens groups.

In the zoom lens system of the present invention, the zoom lens system is zoomed by moving the second lens group and change in the image position is corrected by moving the fourth lens group. The second and fourth lens groups are greatly smaller than the first lens group in both weight and size. Accordingly response speed of movement of the movable lens groups to focusing or zooming operation is very high as compared with moving the first lens group and focusing can satisfactorily follow a high-speed object even when focusing is effected electrically and automatically.

Further since the third lens group has a negative refracting power, the light rays are diverged by the third lens group, whereby a sufficient height of light rays can be ensured and the back focal length can be sufficiently long.

DESCRIPTION OF THE PREFERRED EMBODIMENT

Figure 1:
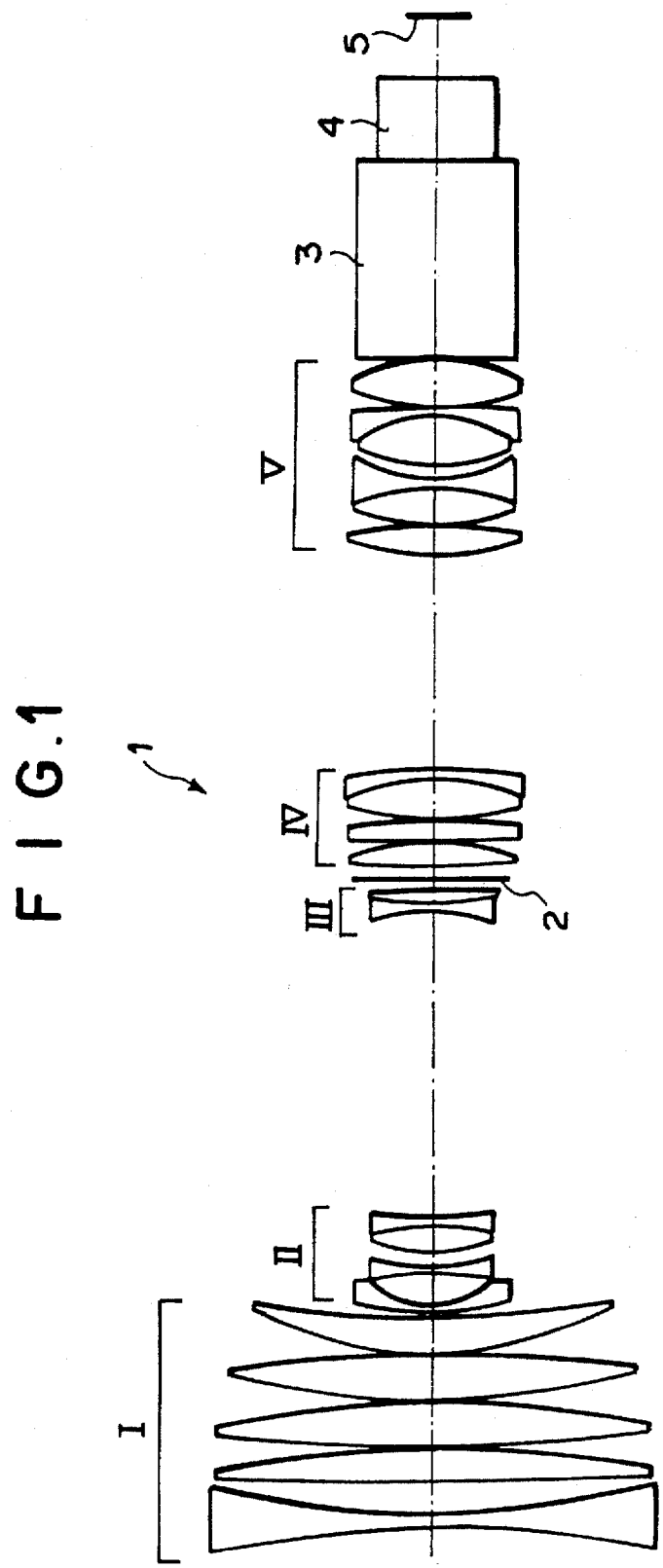
FIG. 1 is a schematic view showing the arrangement of lens elements in a zoom lens system in accordance with an embodiment of the present invention, FIGS. 2A to 2C respectively show spherical aberration, astigmatism and distortion of the zoom lens system at its wide-side end, FIGS. 3A to 3C respectively show spherical aberration, astigmatism and distortion of the zoom lens system at its tele-side end.

As shown in FIG. 1, a zoom lens system 1 in accordance with an embodiment of the present invention comprises first to fifth lens groups I to V. The first, third and fifth lens groups I, III and V are fixed and the second and fourth lens groups II and IV are movable in the direction of the optical axis (chained line). The second lens group II is a zooming system (magnification changing system) and the fourth lens group IV is a correcting lens system for correcting a change in the image position due to zooming operation of the second lens group II or due to change in the object distance.

The first lens group I has a positive refracting power, the second lens group II has a negative refracting power, the third lens group III has a negative refracting power, the fourth lens group IV has a positive refracting power and the fifth lens group V has a positive refracting power. A prism block 3, a low-pass filter 4 and a CCD 5 are disposed behind the fifth lens group V. The radii of curvature r (mm) of the refracting surfaces, the axial surface separations d (mm) (the central thickness of the lenses or the air separations), the refractive indexes n of the lenses and the Abbe's numbers ν of the lenses of the zoom lens system shown in FIG. 1 are shown in table I. The numbers in the leftmost column of table I designate the numbers of the surfaces as numbered from the object side.

TABLE I

| | r | d | n | ν |
|---|---|---|---|---|
| 1 | −202.714 | 2.25 | 1.80517 | 25.4 |
| 2 | 129.165 | 6.01 | | |
| 3 | 698.773 | 6.17 | 1.43387 | 95.1 |
| 4 | −192.694 | 0.12 | | |
| 5 | 289.875 | 7.84 | 1.43387 | 95.1 |
| 6 | −155.216 | 0.12 | | |
| 7 | 120.881 | 7.84 | 1.60300 | 65.5 |
| 8 | −284.866 | 0.12 | | |
| 9 | 60.184 | 6.56 | 1.74100 | 52.6 |
| 10 | 187.711 | D1 | | |
| 11 | 50.686 | 0.80 | 1.83480 | 42.7 |
| 12 | 14.117 | 5.79 | | |

TABLE I-continued

| | r | d | n | ν |
|---|---|---|---|---|
| 13 | −51.808 | 0.75 | 1.81600 | 46.6 |
| 14 | 32.063 | 2.93 | | |
| 15 | 27.360 | 4.77 | 1.80517 | 25.4 |
| 16 | −35.677 | 0.44 | | |
| 17 | −28.055 | 0.75 | 1.81600 | 46.6 |
| 18 | 108.079 | D2 | | |
| 19 | −25.579 | 0.81 | 1.75500 | 52.3 |
| 20 | 57.338 | 2.40 | 1.84655 | 23.9 |
| 21 | −380.691 | 1.87 | | |
| 22 | stop | D3 | | |
| 23 | 198.768 | 4.20 | 1.58267 | 46.5 |
| 24 | −41.931 | 0.12 | | |
| 25 | 3697.781 | 3.70 | 1.58913 | 61.2 |
| 26 | −130.171 | 0.12 | | |
| 27 | 60.764 | 7.00 | 1.48749 | 70.4 |
| 28 | −34.789 | 1.25 | 1.80400 | 46.6 |
| 29 | −99.040 | D4 | | |
| 30 | 48.761 | 4.60 | 1.48749 | 70.4 |
| 31 | −71.853 | 0.12 | | |
| 32 | 36.938 | 6.45 | 1.51454 | 54.6 |
| 33 | −35.944 | 1.30 | 1.83400 | 37.2 |
| 34 | 23.970 | 2.27 | | |
| 35 | 36.636 | 8.15 | 1.51824 | 58.9 |
| 36 | −23.018 | 1.25 | 1.80400 | 46.6 |
| 37 | −201.936 | 0.36 | | |
| 38 | 47.981 | 7.35 | 1.48749 | 70.4 |
| 39 | −30.174 | 1.00 | | |
| 40 | ∞ | 33.00 | 1.58267 | 46.5 |
| 41 | ∞ | 13.20 | 1.51633 | 64.0 |
| 42 | ∞ | | | |

In table I, D1 to D4 respectively denote the separations between the first and second lens groups, between the second and third lens groups, between the third and fourth lens groups and between the fourth and fifth lens groups. Values of D1 to D4 at a focal length of 8.30 and at a focal length of 120.35 are as shown in table II.

TABLE II

| | f = 8.30 | f = 120.35 |
|---|---|---|
| D1 | 0.80 | 47.95 |
| D2 | 52.83 | 5.69 |
| D3 | 1.88 | 1.15 |
| D4 | 37.50 | 38.23 |

Spherical aberration, astigmatism and distortion at a focal length of 8.30 of the zoom lens system of this embodiment are shown in FIGS. 2A to 2C, respectively and 10 those at a focal length of 120.35 are shown in FIGS. 3A to 3C, respectively. In the figures, ω denotes the angle of view.

As can be understood from FIGS. 2A to 2C and FIGS. 3A to 3C, the zoom lens system of this embodiment is excellent in the aberrations.

Further in the zoom lens system of this embodiment, the zoom lens system is zoomed by moving the second lens group II and change in the image position is corrected by moving the fourth lens group IV. Since the second and fourth lens groups II and IV are greatly smaller than the first lens group in both weight and size, response speed of movement of the movable lens groups to focusing or zooming operation is very high as compared with moving the first lens group I and focusing can satisfactorily follow a high-speed object even when focusing is effected electrically and automatically.

Further since the third lens group III has a negative refracting power, the light rays are diverged by the third lens group III and the back focal length can be sufficiently long even if a collimated region is formed behind the fourth lens group IV. At the same time, the fourth lens group IV need not travel a long distance and need not have a large diameter. Accordingly the zoom lens system of this embodiment may be small in size.

Figure 4:
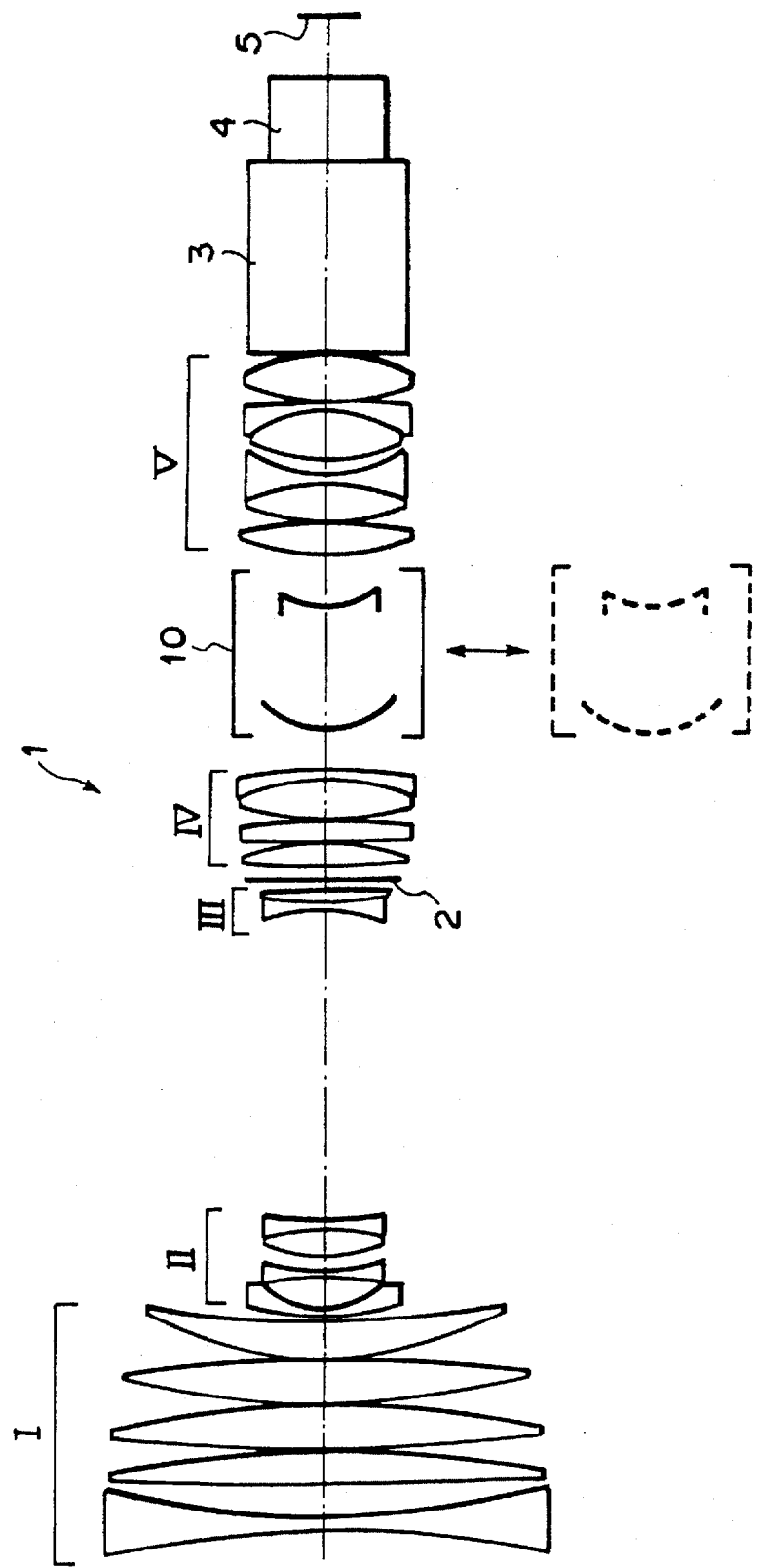
FIG. 4 is a schematic view showing the arrangement of lens elements in a zoom lens system in accordance with another embodiment of the present invention.

As shown in FIG. 4, an extender 10 for changing the focal length of the zoom lens system may be provided to be inserted into and retracted from between the fourth and fifth lens groups IV and V.

Further instead of the extender 10, an anamorphic lens for changing the aspect ratio of an image in the image position may be provided to be inserted into and retracted from between the fourth and fifth lens groups iv and V.

What is claimed is:

1. A zoom lens system consisting of five adjacent lens groups designated as first to fifth lens groups and arranged serially in this order from the object side, the first, third and fifth lens groups being fixed, the second lens group being moved in the direction of the optical axis of the zoom lens system when zooming the zoom lens system and the fourth lens group being moved in the direction of the optical axis to correct change in the image position due to the zooming and to correct change in the image position due to change in the object distance, characterized in that the first lens group has a positive refracting power, the second lens group has a negative refracting power, the third lens group has a negative refracting power, the fourth lens group has a positive refracting power and the fifth lens group has a positive refracting power.

2. A zoom lens system consisting of five adjacent lens groups designated as first to fifth lens groups and arranged serially in this order from the object side, the first, third and fifth lens groups being fixed, the second lens group being moved in the direction of the optical axis of the zoom lens system when zooming the zoom lens system and the fourth lens group being moved in the direction of the optical axis to correct change in the image position due to the zooming and to correct change in the image position due to change in the object distance, characterized in that the first lens group has a positive refracting power, the second lens group has a negative refracting power, the third lens group has a negative refracting power, the fourth lens group has a positive refracting power and the fifth lens group has a positive refracting power, wherein the fourth lens group is arranged so that light rays emerging from the fourth lens group are focused at infinity or at a sufficiently distant position.

3. A zoom lens system comprising first to fifth lens groups arranged in this order from the object side, the first, third and fifth lens groups being fixed, the second lens group being moved in the direction of the optical axis of the zoom lens system when zooming the zoom lens system and the fourth lens group being moved in the direction of the optical axis to correct change in the image position due to the zooming and to correct change in the image position due to change in the object distance characterized in that the first lens group has a positive refracting power the second lens group has a negative refracting power the third lens group has a negative refracting power, the fourth lens group has a positive refracting power and the fifth lens group has a positive refracting power, and an optical element is provided to be inserted into and retracted from between the fourth and fifth lens groups.

4. The zoom lens system of claim 3 wherein said optical element is an anamorphic lens.

5. The zoom lens system of claim 3 wherein said optical element is an extender.

* * * * *